(12) United States Patent
Osada et al.

(10) Patent No.: US 10,946,788 B2
(45) Date of Patent: Mar. 16, 2021

(54) CONTROL DEVICE FOR VEHICLE LAMP

(71) Applicant: KOITO MANUFACTURING CO., LTD., Tokyo (JP)

(72) Inventors: Naoki Osada, Shizuoka (JP); Akira Konishi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/225,572

(22) Filed: Dec. 19, 2018

(65) Prior Publication Data

US 2019/0193623 A1 Jun. 27, 2019

(30) Foreign Application Priority Data

Dec. 27, 2017 (JP) .............................. JP2017-252009

(51) Int. Cl.
*B60Q 1/10* (2006.01)
*B60W 40/076* (2012.01)
(Continued)

(52) U.S. Cl.
CPC ............. *B60Q 1/10* (2013.01); *B60W 40/076* (2013.01); *B60Q 1/04* (2013.01); *B60Q 1/115* (2013.01);
(Continued)

(58) Field of Classification Search
CPC . B60Q 1/04; B60Q 1/18; B60Q 1/115; B60Q 1/00; B60Q 9/00; B60Q 1/10; B60Q 2300/114; B60Q 2300/116; B60Q 2300/132; B60Q 2300/324; B60Q 1/12; B60Q 1/0041; B60Q 1/0023; B60Q 1/26; B60Q 1/50; B60Q 1/143; G08G 1/0969;
(Continued)

(56) References Cited

U.S. PATENT DOCUMENTS 6,109,759 A * 8/2000 Tanabe .................. B60Q 1/115
362/276
6,430,521 B1 * 8/2002 Toda ...................... B60Q 1/115
362/465
(Continued)

FOREIGN PATENT DOCUMENTS

FR 3 019 781 A1 10/2015
JP 2012-106719 A 6/2012

OTHER PUBLICATIONS

Office Action dated Sep. 23, 2020 issued in the French Patent Office in FR 1874208.

*Primary Examiner* — Behrang Badii
(74) *Attorney, Agent, or Firm* — Sughrue Mion, PLLC

(57) ABSTRACT

A control device for a vehicle lamp including an ECU configured to: i) receive a sensor signal and derive a total angle; ii) retain an initial set value of the vehicle posture angle, the initial set value being acquired in an initialization process; iii) retain a reference value of the vehicle posture angle, adjust an optical axis angle of the vehicle lamp in response to a change amount of a total angle during a stop of the vehicle, and retain a sum of the change amount of the total angle and the reference value of the vehicle posture angle as a new reference value; iv) not adjust the optical axis angle in response to a change amount of a total angle during traveling of the vehicle; and v) perform a predetermined reset process when a reset signal is received.

4 Claims, 6 Drawing Sheets

(51) Int. Cl.
*B60Q 1/04* (2006.01)
*B60Q 1/115* (2006.01)

(52) U.S. Cl.
CPC .. *B60Q 2300/114* (2013.01); *B60Q 2300/116* (2013.01); *B60Q 2300/132* (2013.01); *B60Q 2300/324* (2013.01)

(58) Field of Classification Search
CPC ......... G08G 1/096725; G08G 1/09623; G08G 1/163; G08G 1/164; G08G 1/096775; G08G 1/096783; G08G 1/096716; G08G 1/096708; G08G 1/096791; G08G 1/096741; G08G 1/16; G08G 1/167; G05D 1/0891; B60W 50/14; B60W 50/08; B60W 40/076; B60C 9/00; G01C 21/26; B60R 1/00; B60R 11/02; G06K 9/00791; F21S 41/285; F21S 41/635; F21S 8/10; B62J 6/02; H05B 47/105; B60L 15/20; B62K 11/007; F21V 14/00; G01S 17/04; G03B 17/54; G03B 21/00; G03B 21/26; G03B 29/00; H04N 9/3188; H04N 5/74; H04N 9/3185; H04N 9/3194; G01B 11/30

See application file for complete search history.

(56) References Cited

U.S. PATENT DOCUMENTS

| | | | |
|---|---|---|---|
| 6,663,268 B1* | 12/2003 | Toda | B60Q 1/115 362/271 |
| 8,814,402 B2* | 8/2014 | Kasaba | B60Q 1/10 362/466 |
| 2012/0101692 A1 | 4/2012 | Kasaba et al. | |
| 2012/0268958 A1* | 10/2012 | Kasaba | B60Q 1/10 362/466 |
| 2015/0291082 A1* | 10/2015 | Kasaba | B60Q 1/115 701/49 |
| 2017/0129390 A1* | 5/2017 | Akaza | F21S 41/657 |

* cited by examiner

CONTROL DEVICE FOR VEHICLE LAMP

INCORPORATION BY REFERENCE

The disclosure of Japanese Patent Application No. 2017-252009 filed on Dec. 27, 2017 including the specification, drawings and abstract is incorporated herein by reference in its entirety.

BACKGROUND

1. Technical Field

The disclosure relates to a control device for a vehicle lamp and more particularly to a control device for a vehicle lamp which is used for an automobile or the like.

2. Description of Related Art

In the related art, automatic leveling control for changing an irradiation direction of a headlamp by automatically adjusting an optical axis position of the headlamp for a vehicle depending on an inclination angle of the vehicle is known. In automatic leveling control, an optical axis position of a headlamp is generally adjusted based on a pitch angle of a vehicle which is derived from an output value of a vehicle height sensor. On the other hand, Japanese Unexamined Patent Application Publication No. 2012-106719 (JP 2012-106719 A) discloses a control device for a vehicle lamp that executes automatic leveling control using an acceleration sensor.

SUMMARY

When an acceleration sensor is used, it is possible to manufacture an automatic leveling system at a lower cost and to achieve a decrease in weight in comparison with a case in which a vehicle height sensor is used. As a result, it is possible to achieve a decrease in cost and weight of a vehicle. On the other hand, there is always demand for enhancement in accuracy of automatic leveling control even when an acceleration sensor is used.

The disclosure provides a technique for enhancing accuracy of automatic leveling control for a vehicle lamp.

A first aspect of the present disclosure relates to a control device for a vehicle lamp, comprising an electronic control unit configured to: i) receive a predetermined sensor signal and derive a total angle which is an inclination angle of a vehicle with respect to a horizontal plane based on the sensor signal, the total angle including a road surface angle which is an inclination angle of a road surface with respect to the horizontal plane and a vehicle posture angle which is an inclination angle of the vehicle with respect to the road surface; ii) retain an initial set value of the vehicle posture angle, the initial set value being acquired in an initialization process which is performed when the vehicle is in a predetermined reference posture on a predetermined reference road surface; iii) retain a reference value of the vehicle posture angle, adjust an optical axis angle of the vehicle lamp in response to a change amount of a total angle during a stop of the vehicle, and retain a sum of the change amount of the total angle during the stop of the vehicle and the reference value of the vehicle posture angle as a new reference value; iv) not adjust the optical axis angle in response to a change amount of a total angle during traveling of the vehicle; and v) perform a predetermined reset process when a reset signal indicating that the vehicle is in the reference posture is received and cause the reference value of the vehicle posture angle to approach the initial set value in the reset process. With the first aspect, it is able to enhance accuracy of automatic leveling control for a vehicle lamp.

In the first aspect, the electronic control unit may be configured to: i) retain a reference value of the road surface angle and retain a sum of the change amount of the total angle during traveling of the vehicle and the reference value of the road surface angle as a new reference value of the road surface angle; and ii) derive the vehicle posture angle including the change amount of the total angle during the stop of the vehicle from the total angle during the stop of the vehicle and the reference value of the road surface angle.

In the first aspect, the electronic control unit may be configured to derive the vehicle posture angle including the change amount of the total angle during the stop of the vehicle from a difference between before and after the total angle during the stop of the vehicle has changed and the reference value of the vehicle posture angle. With the above configurations, it is possible to enhance accuracy of automatic leveling control for a vehicle lamp.

A second aspect of the present disclosure relates to a control device for a vehicle lamp, comprising an electronic control unit configured to: i) receive a predetermined sensor signal and derive a total angle which is an inclination angle of a vehicle with respect to a horizontal plane based on the sensor signal, the total angle including a road surface angle which is an inclination angle of a road surface with respect to the horizontal plane and a vehicle posture angle which is an inclination angle of the vehicle with respect to the road surface; ii) retain a reference value of the road surface angle, derive the vehicle posture angle including a change amount of a total angle during a stop of the vehicle from the total angle during the stop of the vehicle and the reference value of the road surface angle, and adjust an optical axis angle of the vehicle lamp; iii) not adjust the optical axis angle in response to a change amount of a total angle during traveling of the vehicle and retain a sum of the change amount of the total angle during traveling of the vehicle and the reference value of the road surface angle as a new reference value of the road surface angle; and iv) perform a predetermined reset process when a reset signal indicating that the vehicle is in a predetermined reference posture is received, acquire a total angle in the reset process, and cause the reference value of the road surface angle to approach the total angle acquired in the reset process. With the second aspect, it is able to enhance accuracy of automatic leveling control for a vehicle lamp.

In the second aspect, the electronic control unit may be configured to adjust the optical axis angle based on the vehicle posture angle including the change amount of the total angle during the stop of the vehicle.

In the above aspects, the reset signal may be at least one of the following signals: i) a signal which is transmitted from a predetermined vehicle diagnosing device; ii) a signal which is transmitted from a switch that controls a lighting state of the vehicle lamp and which indicates that a predetermined operation of the switch has been performed; iii) a signal which is transmitted from an ignition switch; and iv) a signal which indicates that the vehicle is located in at least one of a market and a factory.

According to the each of the aspects of the present disclosure, it is possible to enhance accuracy of automatic leveling control for a vehicle lamp.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
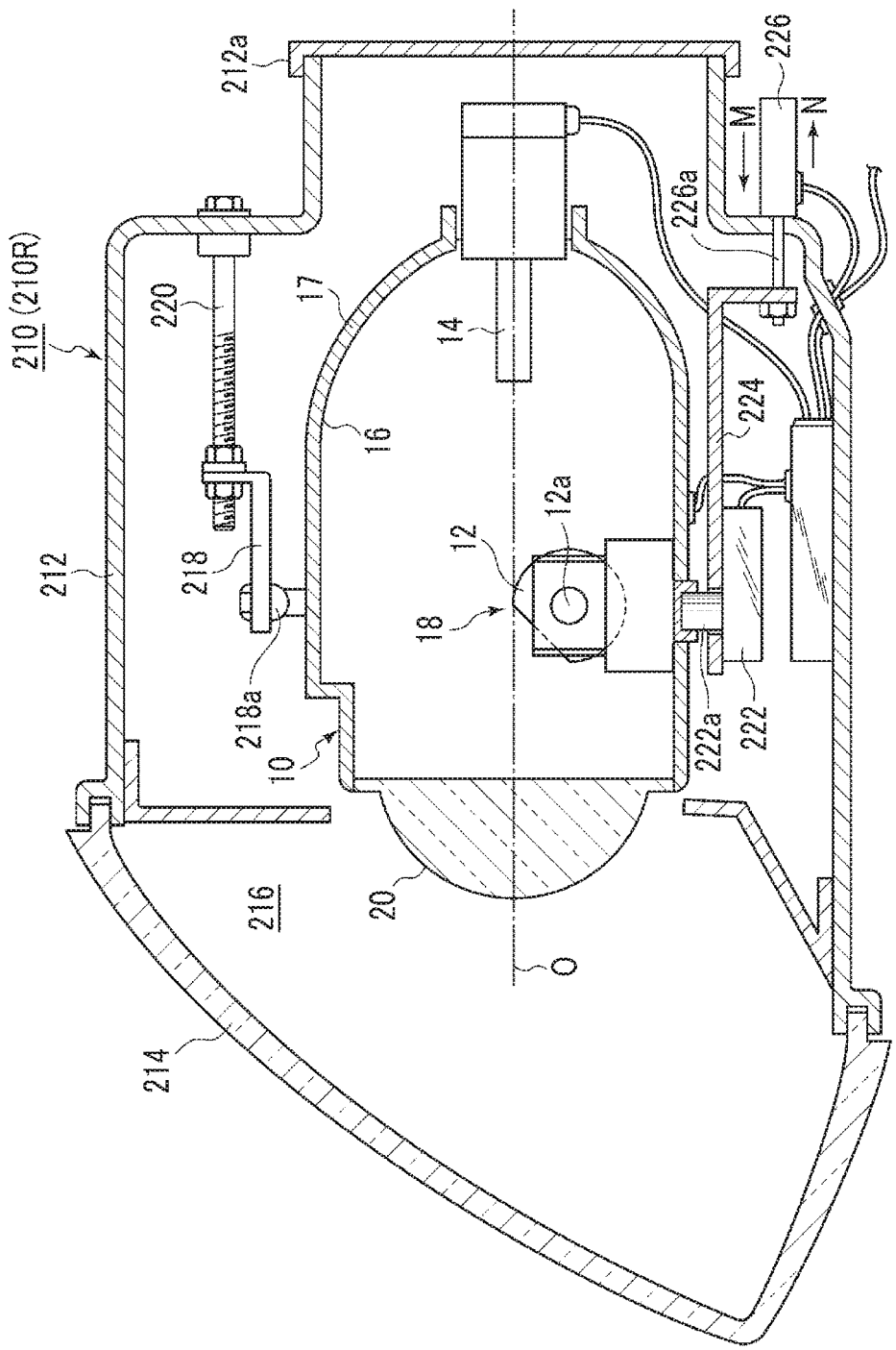
FIG. 1 is a vertical sectional view schematically illustrating a headlamp unit including a vehicle lamp which is controlled by a control device according to an embodiment.

Hereinafter, exemplary embodiments of the disclosure will be described with reference to the accompanying drawings. The embodiments are not intended to limit the disclosure but are merely exemplary, and not all features or combinations thereof which are described in the embodiments are essential to the disclosure. The same or equivalent elements, members, and processes illustrated in the drawings will be referred to by the same reference signs and description thereof will be appropriately omitted. Scales or shapes of parts illustrated in the drawings are conveniently set for facilitating explanation thereof and should not be construed to be restrictive unless that is specifically stated. When terms such as "first" and "second" are used in the specification or the appended claims, the terms do not refer to a certain order or degree of importance unless that is specifically stated, but are used to distinguish one element from another element.

In the specification, "during traveling of a vehicle" refers to, for example, a period from a time at which an output value of a vehicle speed sensor 312 which will be described later becomes greater than 0 to a time at which the output value of the vehicle speed sensor 312 becomes 0. "A time at which a vehicle stops" refers to, for example, a time at which an output value of an acceleration sensor 110 which will be described later settles after the output value of the vehicle speed sensor 312 has become zero. "During a stop of a vehicle" refers to, for example, a period from a time at which the output value of the acceleration sensor 110 settles after the output value of the vehicle speed sensor 312 has become zero to a time at which the output value of the vehicle speed sensor 312 becomes greater than 0. "A time of settling" may be set to a time at which change of the output value of the acceleration sensor 110 per unit time becomes equal to or less than a predetermined amount or may be set to a time at which a predetermined time (for example, one or two seconds) has elapsed after the output value of the vehicle speed sensor 312 has become 0. "A vehicle 300 is at a standstill" means that the vehicle 300 is in a state of the "time at which the vehicle stops" or is in a state of "during a stop of the vehicle." "Immediately after a vehicle has started" refers to, for example, a predetermined time after the output value of the vehicle speed sensor 312 has become greater than 0. "Immediately before a vehicle starts" refers to, for example, a predetermined time before the output value of the vehicle speed sensor 312 becomes greater than 0. "During traveling of a vehicle," "a time at which a vehicle stops," "during a stop of a vehicle," "a time of being settled," "immediately after a vehicle starts," "immediately before a vehicle starts," "a predetermined amount," and "a predetermined time" may be appropriately set based on experiment or simulation by a designer.

First Embodiment

FIG. 1 is a vertical sectional view schematically illustrating a headlamp unit including a vehicle lamp which is controlled by a control device according to a first embodiment. A headlamp unit 210 has a structure in which headlamp units which are formed symmetrically are disposed on right and left sides in a vehicle width direction of a vehicle. The right headlamp unit 210R and the left headlamp unit 210L have substantially the same structure and thus the structure of the right headlamp unit 210R will be described below. The headlamp unit 210R includes a lamp body 212 having an opening on the front side of the vehicle and a light-transmitting cover 214 that covers the opening. The lamp body 212 includes a detachable cover 212a on the rear side of the vehicle. A lamp chamber 216 is defined by the lamp body 212 and the light-transmitting cover 214. A lamp unit 10 is disposed as a vehicle lamp in the lamp chamber 216.

A lamp bracket 218 having a pivot mechanism 218a which is a pivot center in the upward, downward, rightward, and leftward directions of the lamp unit 10 is connected to the lamp unit 10. The lamp bracket 218 is screwed to an aiming adjusting screw 220 which is supported by the lamp body 212. A rotation shaft 222a of a swivel actuator 222 is fixed to a bottom surface of the lamp unit 10. The swivel actuator 222 is fixed to a unit bracket 224. A leveling actuator 226 is connected to the unit bracket 224. The leveling actuator 226 is constituted, for example, by a motor that causes a rod 226a to extend and contract in directions of arrows M and N. For example, a DC motor is used as the motor constituting the leveling actuator 226. The lamp unit 10 assumes a rearward-inclined posture and a forward-inclined posture by causing the rod 226a to extend and contract in the directions of arrows M and N, and thus leveling adjustment of directing a pitch angle of an optical axis O downward and upward can be performed. That is, the leveling actuator 226 corresponds to an actuator that changes a posture of the lamp unit 10.

The lamp unit 10 includes a shade mechanism 18 including a rotary shade 12, a light source 14, a lamp housing 17 that supports a reflector 16 to an inner wall thereof, and a projection lens 20. As the light source 14, an incandescent bulb, a halogen lamp, a discharge bulb, an LED, a laser diode, an organic or inorganic EL, or the like can be used. At least a part of the reflector 16 has an oval spherical shape, and the reflector 16 reflects light emitted from the light source 14. A part of light from the light source 14 and light reflected by the reflector 16 is guided to the projection lens 20 via the rotary shade 12. The rotary shade 12 is a cylindrical member that can rotate about a rotation shaft 12a and includes a cutout portion and a plurality of shade plates (not illustrated). One of the cutout portion and the shade plate moves on the optical axis O to form a predetermined light distribution pattern. The projection lens 20 is formed of a plano-convex aspherical lens and projects a light source image formed on a rear focal plane as an inverted image onto a virtual vertical screen in front of the lamp. The structure of the lamp unit 10 is not limited to the above description, and may include, for example, a shutter type shade or may be a reflective lamp unit not including the projection lens 20.

Figure 2:
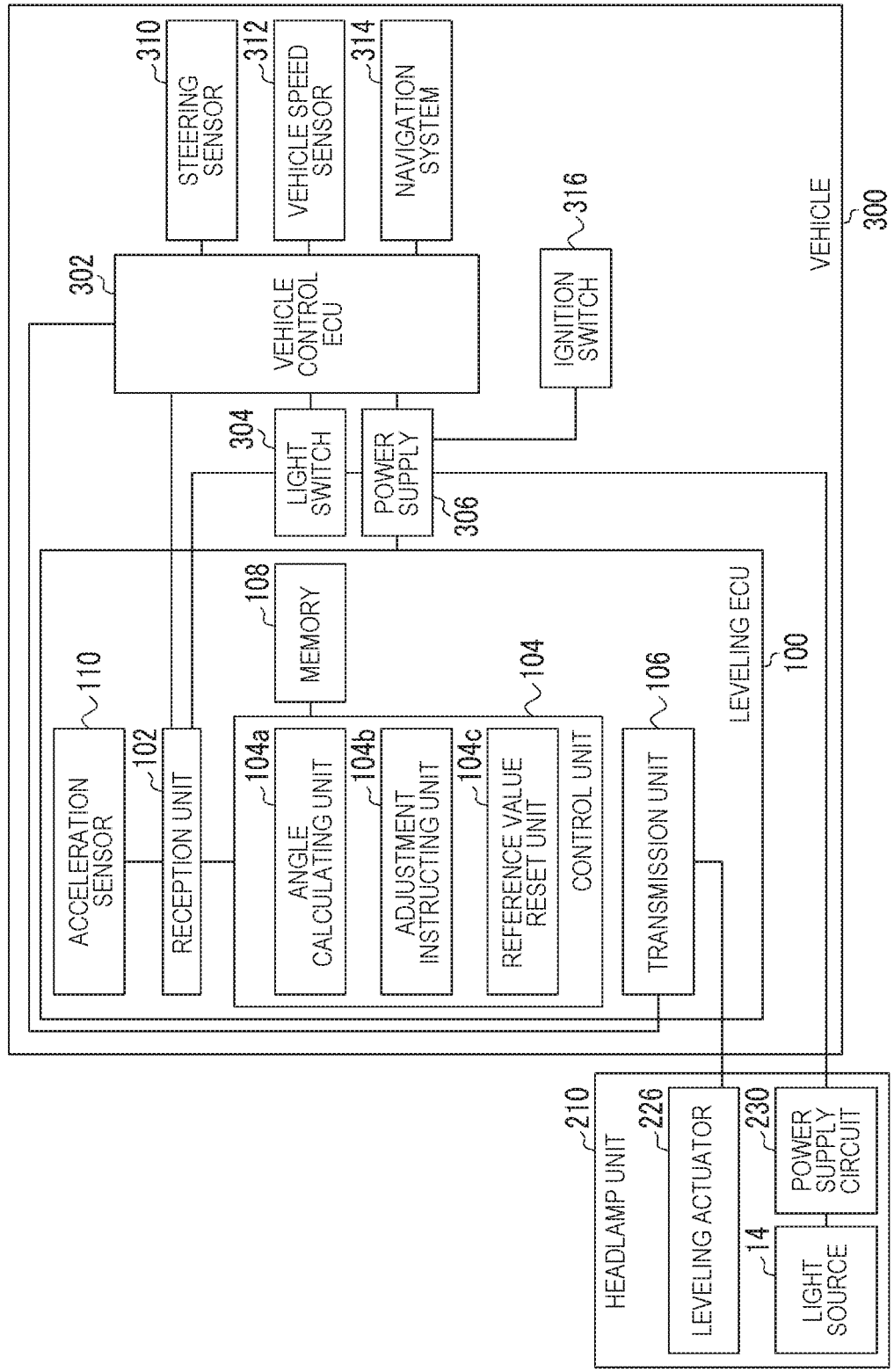
FIG. 2 is a functional block diagram illustrating cooperation in operation among a headlamp unit, a vehicle control ECU, and a leveling ECU.

FIG. 2 is a functional block diagram illustrating cooperation in operation among a headlamp unit, a vehicle control ECU, and a leveling ECU. In FIG. 2, the headlamp unit 210R and the headlamp unit 210L are illustrated together as the headlamp unit 210. A leveling ECU 100 and a vehicle control ECU 302 are embodied by elements or circuits such as a CPU or a memory of a computer as a hardware configuration thereof and are embodied by a computer program or the like as a software configuration thereof, but are illustrated as functional blocks which are embodied in cooperation in FIG. 2. These functional blocks can be embodied in various forms by combination of hardware and software.

The leveling ECU 100 as a control device for a vehicle lamp includes a reception unit 102, a control unit 104, a transmission unit 106, a memory 108 as a storage unit, and an acceleration sensor 110 as an inclination sensor. The leveling ECU 100 is installed, for example, in the vicinity of a dashboard of a vehicle 300. The installation position of the leveling ECU 100 is not particularly limited and may be disposed, for example, in the headlamp unit 210. The acceleration sensor 110 may be disposed outside the leveling ECU 100. For example, the acceleration sensor 110 may be disposed at an arbitrary position in a vehicle body or inside the headlamp unit 210. The vehicle control ECU 302, the light switch 304, and the like are connected to the leveling ECU 100. Signals output from the vehicle control ECU 302, the light switch 304, and the like are received by the reception unit 102. The reception unit 102 receives a signal indicating an output value from the acceleration sensor 110 and a predetermined reset signal.

A steering sensor 310, a vehicle speed sensor 312, a navigation system 314, and the like are connected to the vehicle control ECU 302. Signals output from the sensors are received by the reception unit 102 of the leveling ECU 100 via the vehicle control ECU 302. The vehicle speed sensor 312 is a sensor that calculates a speed of the vehicle 300, for example, based on rotation speeds of vehicle wheels. The light switch 304 transmits a signal for controlling a lighting state of the lamp unit 10, a signal for instructing execution of automatic leveling control, or the like to a power supply 306, the vehicle control ECU 302, the leveling ECU 100, and the like depending on operation details from a driver. Control of a lighting state of the lamp unit 10 includes on and off of the lamp unit 10 and switching of a light distribution pattern which is formed.

A signal received by the reception unit 102 is transmitted to the control unit 104. The control unit 104 executes automatic leveling control of deriving an inclination angle of the vehicle 300 or change thereof using an output value from the acceleration sensor 110 and outputting an adjustment signal for a pitch angle of the optical axis O (hereinafter appropriately referred to as an optical axis angle θo) of the lamp unit 10. The control unit 104 includes an angle calculating unit 104a, an adjustment instructing unit 104b, and a reference value reset unit 104c.

The angle calculating unit 104a generates pitch angle information of the vehicle 300 using the output value from the acceleration sensor 110 and information stored in a RAM (not illustrated) or the memory 108 of the leveling ECU 100 if necessary. The adjustment instructing unit 104b generates an adjustment signal for instructing adjustment of the optical axis angle θo of the lamp unit 10 using the pitch angle information generated by the angle calculating unit 104a. The adjustment instructing unit 104b outputs the generated adjustment signal to the leveling actuator 226 via the transmission unit 106. The leveling actuator 226 is driven based on the received adjustment signal and the optical axis O of the lamp unit 10 is adjusted with respect to a pitch angle direction. The reference value reset unit 104c performs a predetermined reset process. Operations of the constituent units of the control unit 104 will be described in detail later.

A power supply 306 that supplies electric power to the leveling ECU 100, the vehicle control ECU 302, and the headlamp unit 210 is mounted in the vehicle 300. When it is instructed to turn the headlamp unit 210 on with an operation of the light switch 304, electric power is supplied from the power supply 306 to the light source 14 via a power supply circuit 230. Supply of electric power from the power supply 306 to the leveling ECU 100 is performed when an ignition switch 316 is turned on, and is stopped when the ignition switch 316 is turned off.

(Automatic Leveling Control)

Figure 3:
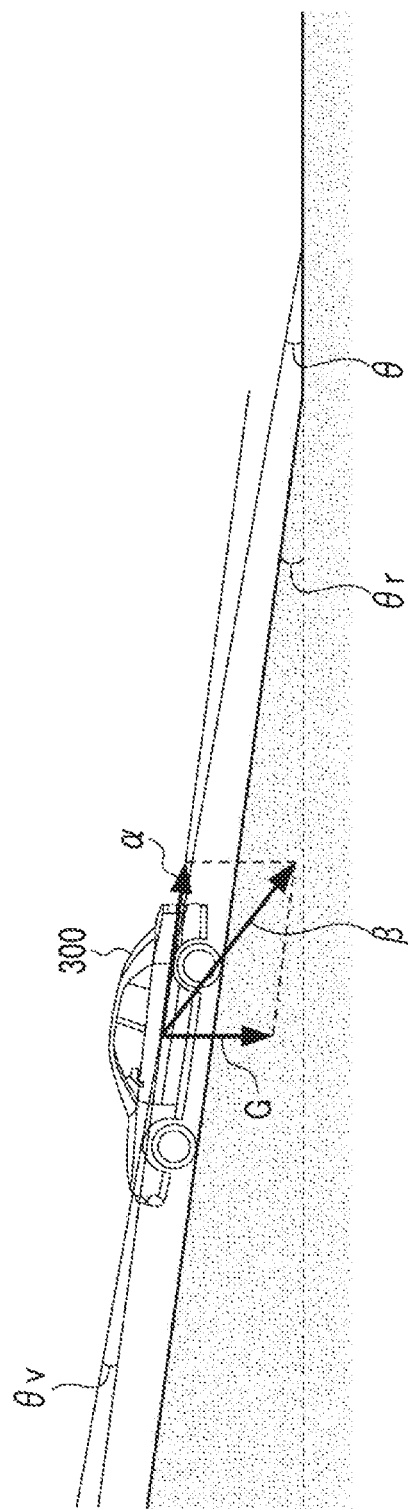
FIG. 3 is a diagram schematically illustrating an acceleration vector which is generated in a vehicle and an inclination angle of the vehicle which can be detected by an acceleration sensor.

Automatic leveling control which is executed by the leveling ECU 100 having the above-mentioned configuration will be described below in detail. FIG. 3 is a diagram schematically illustrating an acceleration vector which is generated in a vehicle and an inclination angle of the vehicle which can be detected by an acceleration sensor.

For example, the vehicle is in a rearward-inclined posture when luggage is loaded in a rear cargo compartment of the vehicle or an occupant sits on a rear seat, and the vehicle is inclined forward from the rearward-inclined posture when the luggage is unloaded from the cargo compartment or the occupant on the rear seat gets out of the vehicle. When the vehicle 300 enters the rearward-inclined posture or the forward-inclined posture, the irradiation direction of the lamp unit 10 also changes upward or downward and a forward irradiation distance increases or decreases. Therefore, the leveling ECU 100 derives an inclination angle in the pitch direction of the vehicle 300 or the change thereof from the output value from the acceleration sensor 110 and sets the optical axis angle θo to an angle based on the vehicle posture. By executing automatic leveling control for performing leveling adjustment of the lamp unit 10 in real time based on the vehicle posture, a forward range of irradiation light can be optimally adjusted even when the vehicle posture changes.

In this embodiment, the acceleration sensor 110 is, for example, a triaxial acceleration sensor having an X axis, a Y axis, and a Z axis which are perpendicular to each other. The acceleration sensor 110 is attached to the vehicle 300 in an arbitrary posture and detects an acceleration vector which is generated in the vehicle 300. A gravitational acceleration and a motion acceleration based on movement of the vehicle 300 are generated in the vehicle 300 which is traveling. Accordingly, the acceleration sensor 110 can detect a combined acceleration vector β in which a gravitational acceleration vector G and a motion acceleration vector α are combined as illustrated in FIG. 3. During a stop of the vehicle 300, the acceleration sensor 110 can detect the gravitational acceleration vector G. The acceleration sensor 110 outputs numerical values of axial components of the detected acceleration vector.

The acceleration sensor 110 is attached to the vehicle 300 in an arbitrary posture, and the X axis, the Y axis, and the Z axis of the acceleration sensor 110 (axes of the sensor side) in a state in which the acceleration sensor 110 is attached to the vehicle 300 do not necessarily coincide with a longitudinal axis, a lateral axis, and a vertical axis of the vehicle 300

(axes of the vehicle side) which determine the posture of the vehicle 300. Accordingly, the control unit 104 needs to convert triaxial components output from the acceleration sensor 110, that is, components in a sensor coordinate system, into triaxial components of the vehicle 300, that is, components in a vehicle coordinate system.

The leveling ECU 100 stores reference axis information indicating positional relationships between the axes of the acceleration sensor 110 attached to the vehicle 300, the axes of the vehicle 300, and the road surface angle in advance. For example, the leveling ECU 100 stores a conversion table in which numerical values of axial components in the output value from the acceleration sensor 110 are correlated with numerical values of the axial components of the vehicle 300 as reference axis information in the memory 108. The memory 108 in this embodiment is a nonvolatile memory. Numerical values of the components of the X axis, the Y axis, and the Z axis output from the acceleration sensor 110 are converted into components of the longitudinal axis, the lateral axis, the vertical axis of the vehicle 300 using the reference axis information by the angle calculating unit 104a of the control unit 104. Accordingly, accelerations in the vehicle longitudinal direction, the vehicle lateral direction, and the vehicle vertical direction can be derived from the output value from the acceleration sensor 110.

An inclination of the vehicle 300 with respect to the gravitational acceleration vector G can be derived from the output value of the acceleration sensor 110 during a stop of the vehicle. That is, a total angle θ which is an inclination angle of the vehicle 300 with respect to a horizontal plane can be derived from the output value of the acceleration sensor 110. The total angle θ includes a road surface angle θr which is an inclination angle of the road surface with respect to the horizontal plane and a vehicle posture angle θv which is an inclination angle of the vehicle 300 with respect to the road surface. The road surface angle θr, the vehicle posture angle θv, and the total angle θ are angles in the pitch direction of the vehicle 300.

Automatic leveling control is executed to absorb change of the forward irradiation distance of a vehicle lamp based on change of the inclination angle in the pitch direction of the vehicle 300 and to optimally maintain the forward range of irradiation light. Accordingly, the inclination angle of the vehicle 300 which is required for automatic leveling control is the vehicle posture angle θv. That is, in automatic leveling control, it is preferable that the optical axis angle θo of the lamp unit 10 be adjusted when the vehicle posture angle θv changes, and the optical axis angle θo of the lamp unit 10 be maintained when the road surface angle θr changes. For realization of this, information on the vehicle posture angle θv needs to be extracted from the total angle θ.

(Basic Control)

On the other hand, the control unit 104 executes basic control of automatic leveling which will be described below. In basic control, change of the total angle θ during traveling of the vehicle is estimated to be change of the road surface angle θr, change of the total angle θ during a stop of the vehicle is estimated to be change of the vehicle posture angle θv, and the vehicle posture angle θv is derived from the total angle θ. During traveling of the vehicle, there is low likelihood that a load of cargo or the number of occupants will increase or decrease and thus the vehicle posture angle θv will change. Accordingly, change of the total angle θ during traveling of the vehicle can be estimated to be change of the road surface angle θr. During a stop of the vehicle, there is a low likelihood that the vehicle 300 will move and the road surface angle θr will change. Accordingly, change of the total angle θ during a stop of the vehicle can be estimated to be change of the vehicle posture angle θv.

First, when the vehicle 300 is in a predetermined reference posture on a predetermined reference road surface, a predetermined initialization process is performed. Then, an initial set value of the road surface angle θr and an initial set value of the vehicle posture angle θv are acquired in the initialization process and are stored in the memory 108 as a storage unit. Specifically, for example, in a manufacturing factory of a vehicle manufacturer or a maintenance factory of a dealer, the vehicle 300 is placed on a reference road surface which is designed to be parallel to the horizontal plane and is in a reference posture. For example, the reference posture is a posture of the vehicle 300 when one occupant sits on a driver seat or no occupant gets in the vehicle. Then, an initialization signal is transmitted by an operation of a switch of an initialization processing device in a factory, by communication via a controller area network (CAN) system, or the like. The control unit 104 performs a predetermined initialization process when the initialization signal has been received. In the initialization process, initial aiming adjustment is performed and the optical axis O of the lamp unit 10 is set to an initial angle. The angle calculating unit 104a of the control unit 104 stores the output value of the acceleration sensor 110 in the reference state as the initial set value of the road surface angle θr (for example, θr=0°) and the initial set value of the vehicle posture angle θv (for example, θv=0°) in the RAM in a volatile manner. Such initial set values are written to the memory 108 and are stored in a nonvolatile manner.

Then, the control unit 104 derives the total angle θ using the output value of the acceleration sensor 110 and outputs an adjustment signal for the optical axis angle θo in response to the change of the total angle θ during a stop of the vehicle to drive the leveling actuator 226. The control unit 104 avoids driving of the leveling actuator 226 in response to the change of the total angle θ during traveling of the vehicle.

At the time of starting of automatic leveling control, the control unit 104 uses the initial set value of the vehicle posture angle θv as a reference value of the vehicle posture angle θv and uses the initial set value of the road surface angle θr as a reference value of the road surface angle θr. Then, the control unit 104 stores a vehicle posture angle θv, which is the same as a sum of: i) the change of the total angle θ during a stop of the vehicle; and ii) the reference value of the vehicle posture angle θv, as a new reference value of the vehicle posture angle θv. The control unit 104 stores a road surface angle θr, which is the same as a sum of: i) the change of the total angle θ during traveling of the vehicle; and ii) the reference value of the road surface angle θr, as a new reference value of the road surface angle θr.

For example, when the vehicle 300 is actually used, in response to the change of the total angle θ during traveling of the vehicle, the control unit 104 avoids generation or output of an adjustment signal instructing to adjust the optical axis angle θo or outputs a maintenance signal instructing maintenance of the optical axis angle θo. Accordingly, it is possible to avoid driving of the leveling actuator 226. The angle calculating unit 104a calculates a current total angle θ (at the time at which the vehicle stops) from the output value of the acceleration sensor 110 at the time at which the vehicle stops. Subsequently, the angle calculating unit 104a subtracts the reference value of the vehicle posture angle θv from the current total angle θ to acquire a road surface angle θr (θr=θ−reference value of θv).

The angle calculating unit 104a updates the reference value of the road surface angle θr stored in the RAM using the acquired road surface angle θr as a new reference value of the road surface angle θr. A difference between the reference value of the road surface angle θr before being updated and the reference value of the road surface angle θr after being updated corresponds to the change of the total angle θ before and after the vehicle 300 travels. Accordingly, the change of the total angle θ during traveling of the vehicle which is estimated to be the change of the road surface angle θr is introduced into the reference value of the road surface angle θr. At first, the reference value of the road surface angle θr is the same as the initial set value at the time of starting of automatic leveling control, and then becomes a value different from the initial set value by updating the reference value.

The control unit 104 drives the leveling actuator 226 by generating and outputting an adjustment signal for the optical axis angle θo in response to the change of the total angle θ during a stop of the vehicle. Specifically, during a stop of the vehicle, the angle calculating unit 104a repeatedly calculates the current total angle θ from the output value of the acceleration sensor 110 at predetermined timings. The calculated total angle θ is stored in the RAM. The angle calculating unit 104a derives the vehicle posture angle θv including the change of the total angle θ during a stop of the vehicle from the total angle θ and the reference value of the road surface angle θr. For example, the angle calculating unit 104a subtracts the reference value of the road surface angle θr from the current total angle θ to acquire the vehicle posture angle θv including the change of the total angle θ (θv=θ−reference value of θr). The vehicle posture angle θv is the same as a sum of: i) the change of the total angle θ during a stop of the vehicle; and ii) the reference value of the vehicle posture angle θv.

The angle calculating unit 104a updates the reference value of the vehicle posture angle θv stored in the RAM using the acquired vehicle posture angle θv as a new reference value of the vehicle posture angle θv. Accordingly, the change of the vehicle posture angle θv and the estimated change of the total angle θ during a stop of the vehicle are introduced into the reference value of the vehicle posture angle θv. At first, the reference value of the vehicle posture angle θv is the same as the initial set value at the time of starting of automatic leveling control, and then becomes a value different from the initial set value by updating the reference value.

Then, the adjustment instructing unit 104b generates the adjustment signal for the optical axis angle θo using the calculated vehicle posture angle θv or the updated reference value of the vehicle posture angle θv. For example, the adjustment instructing unit 104b determines the optical axis angle θo using a conversion table, in which the value of the vehicle posture angle θv is correlated with the value of the optical axis angle θo, stored in advance in the memory 108 and generates the adjustment signal. The adjustment signal is output from the transmission unit 106 to the leveling actuator 226.

The control unit 104 stores at least one of the reference value of the road surface angle θr and the reference value of the vehicle posture angle θv which are stored in the RAM in the memory 108 when the ignition switch 316 is turned off. Accordingly, even when the ignition switch 316 is turned off, the reference value of the road surface angle θr or the reference value of the vehicle posture angle θv can be stored. The control unit 104 can detect turning-off of the ignition switch 316 by receiving an IG-OFF signal emitted from the vehicle control ECU 302 or detecting that a source voltage supplied to the control unit 104 becomes equal to or less than a predetermined value.

In a state in which the ignition switch 316 is turned off, there is a very low likelihood that the vehicle 300 will move and the road surface angle θr will change. Accordingly, the change of the total angle θ from turning-off of the ignition switch 316 to turning-on thereof can be estimated to be the change of the vehicle posture angle θv. Therefore, when the ignition switch 316 is turned on, the control unit 104 derives the current vehicle posture angle θv using the current total angle θ acquired from the output value of the acceleration sensor 110 and the reference value thereof stored in the memory 108 as first control after being started.

When the reference value of the road surface angle θr is stored in the memory 108, the control unit 104 subtracts the reference value of the road surface angle θr from the current total angle θ acquired from the output value of the acceleration sensor 110 to acquire the current vehicle posture angle θv.

When the reference value of the vehicle posture angle θv is stored in the memory 108, the control unit 104 stores a detection value of the acceleration sensor 110 detected finally before the ignition switch 316 is turned off or the total angle θ in addition to the reference value of the vehicle posture angle θv in the memory 108 at the time of turning off of the ignition switch 316. In first control after being started, the control unit 104 calculates a difference between the total angle θ acquired from the current detection value of the acceleration sensor 110 and the total angle θ acquired from the detection value of the acceleration sensor 110 detected finally before the ignition switch 316 is turned off. Then, the control unit 104 calculates the current vehicle posture angle θv from the acquired difference and the reference value of the vehicle posture angle θv.

The control unit 104 stores the acquired vehicle posture angle θv as a new reference value in the RAM. The control unit 104 adjusts the optical axis using the acquired vehicle posture angle θv or the new reference value of the vehicle posture angle θv. Accordingly, the change of the vehicle posture angle θv while the ignition switch 316 is being turned off can be introduced into the reference value and the optical axis angle θo can be adjusted to an appropriate position. As a result, it is possible to enhance accuracy of automatic leveling control.

(Reset Process)

In this embodiment, the change of the total angle θ during a stop of the vehicle is estimated to be the change of the vehicle posture angle θv. The change of the total angle θ while the ignition switch 316 is turned off is also estimated to be the change of the vehicle posture angle θv. Accordingly, it is possible to execute automatic leveling control with high accuracy with a simple control structure. However, although being rare, the road surface angle θr may change during a stop of the vehicle or during turning-off of the ignition switch 316. For example, when the vehicle 300 is transported by a ship, a car carrier, or the like or is towed or when the vehicle 300 is moved by a belt conveyor or a lift in a factory, the road surface angle θr can change during a stop of the vehicle. Accordingly, when the change of the total angle θ during a stop of the vehicle or during turning-off of the ignition switch is estimated to be the change of the vehicle posture angle θv, there is a likelihood that an error will occur between the actual vehicle posture angle θv and the estimated vehicle posture angle θv.

Therefore, in this embodiment, the reference value reset unit 104c of the control unit 104 receives a reset signal indicating that the vehicle 300 is in the reference posture and performs a predetermined reset process. In the reset process, the reference value reset unit 104c causes the reference value of the vehicle posture angle θv stored in the RAM to approach the initial set value stored in the memory 108. The term, "approach," includes that the reference value becomes equal to the initial set value. It is preferable that the reference value reset unit 104c cause the reference value to become equal to the initial set value. The reference value reset unit 104c may correct the stored reference value or may delete the stored reference value and store the initial set value as the reference value again.

By performing the reset process, the stored reference value of the vehicle posture angle θv can be caused to approach the actual vehicle posture angle θv. In the reset process, the angle calculating unit 104a subtracts the reset reference value of the vehicle posture angle θv from the total angle θ to calculate the road surface angle θr. Then, the angle calculating unit 104a stores the calculated road surface angle θr as a new reference value. Accordingly, in subsequent basic control, the vehicle posture angle θv can be calculated using the reference value of the road surface angle θr closer to the actual road surface angle θr. Accordingly, it is possible to enhance accuracy of automatic leveling control. In the reset process, the optical axis angle θo may be adjusted using the reset reference value of the vehicle posture angle θv.

One condition that the reset process is to be performed is that the vehicle 300 is in the reference posture. The reference posture is a posture of the vehicle 300 in the initialization process. The execution condition of the initialization process that the vehicle 300 is on the reference road surface is not necessary for the reset process. The reset signal serving as a trigger of the reset process is a signal which is transmitted when the likelihood that the vehicle 300 will be in the reference posture is estimated to be high.

For example, the reset signal may be at least one signal of: a signal which is transmitted from a predetermined vehicle diagnosing device, a signal which is transmitted from the light switch 304 that controls the lighting state of the lamp unit 10 and which indicates that a predetermined operation is performed on the light switch 304, a signal which is transmitted from the ignition switch 316, and a signal which indicates that the vehicle 300 is located in at least one of a market and a factory.

In general, a vehicle diagnosing device is installed in a manufacturing factory or a maintenance factory. Accordingly, a situation in which a signal is received from a vehicle diagnosing device means that the vehicle 300 is located in such a factory. In such a factory, there is a high likelihood that the vehicle 300 will be in the reference posture. Accordingly, a signal which is transmitted from a vehicle diagnosing device can be used as the reset signal.

When a driver performs a predetermined operation on the light switch 304, a signal based on the predetermined operation is transmitted from the light switch 304. An example of the predetermined operation is an operation of switching between formation of a first light distribution pattern and formation of a second light distribution pattern a predetermined number of times within a predetermined time. The first light distribution pattern is, for example, a light distribution pattern for a high beam and the second light distribution pattern is, for example, a light distribution pattern for a low beam. A user is instructed to perform a predetermined operation on the light switch 304 in a state in which the vehicle 300 is in the reference posture in a manual or the like and the user performs the predetermined operation on the light switch 304 in accordance with the instruction. Accordingly, the signal which is transmitted from the light switch 304 can be used as the reset signal.

In general, when the ignition switch 316 is switched between an ON state and an OFF state, the likelihood that the vehicle 300 will be in the reference posture can be estimated to be high. Accordingly, the signal which is transmitted from the ignition switch 316 can be used as the reset signal.

In a state in which the vehicle 300 is located in a market or a factory, there is a high likelihood that the vehicle 300 will be in the reference posture. Accordingly, a signal indicating that the vehicle 300 is located in at least one of a market and a factory can be used as the reset signal. Examples of the signal indicating that the vehicle 300 is located in at least one of a market and a factory include an identification signal indicating that the vehicle 300 is located in a market or a factory and flowing via the onboard network of the vehicle 300 or a position information signal of a GPS which is transmitted from the navigation system 314 or the like.

Figure 4:
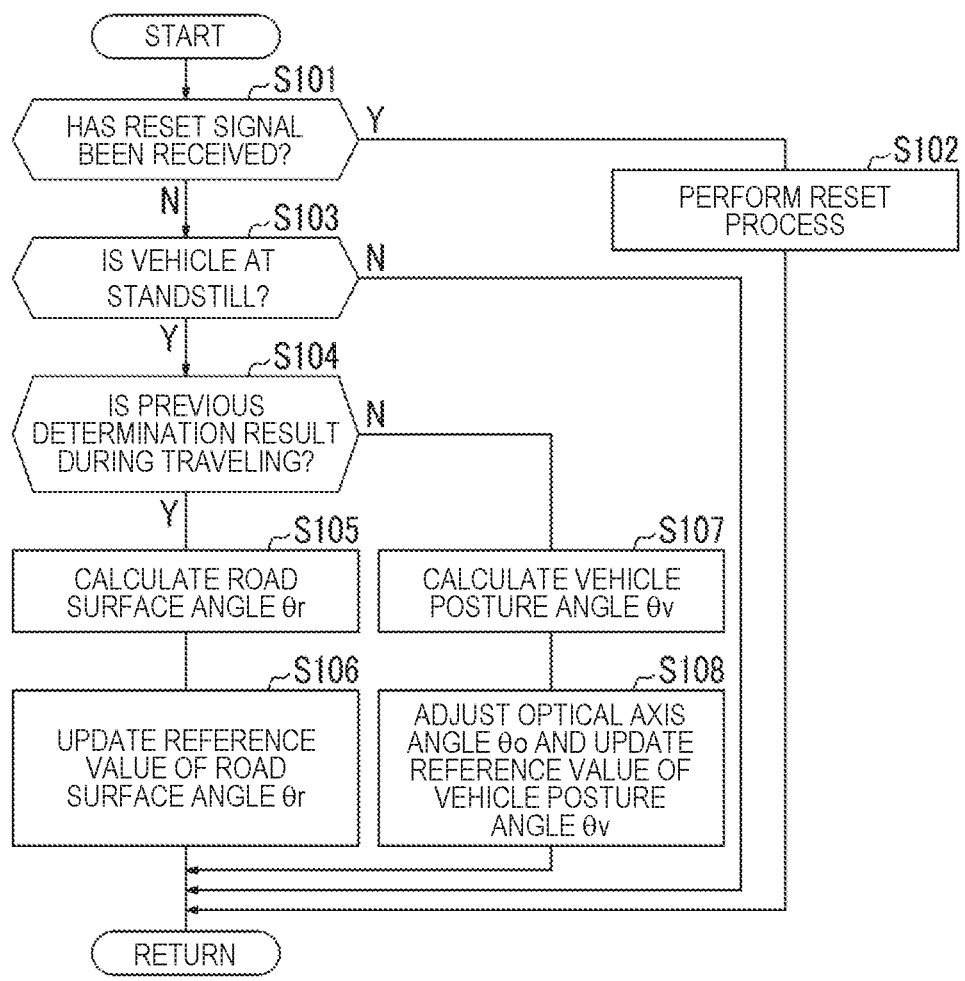
FIG. 4 is a flowchart illustrating an example of automatic leveling control which is performed by a control device for a vehicle lamp according to a first embodiment.

FIG. 4 is a flowchart illustrating an example of automatic leveling control which is performed by the control device for a vehicle lamp according to the first embodiment. For example, this routine is repeatedly performed at predetermined intervals by the control unit 104 when an instruction to execute automatic leveling control is transmitted from the light switch 304 and the ignition switch 316 is turned on, and ends when the instruction to execute automatic leveling control is released (or a stopping instruction is transmitted) or the ignition switch 316 is turned off.

First, the control unit 104 determines whether a reset signal is received (S101). When a reset signal is received (Y in S101), the control unit 104 performs a reset process (S102) and ends this routine. When a reset signal is not received (N in S101), the control unit 104 determines whether the vehicle 300 is at a standstill (S103). When the vehicle 300 is not at a standstill (N in S103), that is, when the vehicle 300 is traveling, the control unit 104 ends this routine.

When the vehicle 300 is at a standstill (Y in S103), the control unit 104 determines whether it was determined in S103 of a previous routine that the vehicle 300 is traveling (N in S103) (S104). When it was determined in the previous determination that the vehicle 300 is traveling (N in S104), it means that now is "the time at which the vehicle stops", and the control unit 104 subtracts a reference value of a vehicle posture angle θv from a current total angle θ to calculate a road surface angle θr (S105). Then, the control unit 104 stores the acquired road surface angle θr as a new reference value of the road surface angle θr (S106) and ends this routine.

When it was determined in the previous determination that the vehicle 300 is not traveling (N in S104), it means that now is "during a stop of the vehicle", and the control unit 104 subtracts the reference value of the road surface angle θr from the current total angle θ to calculate the vehicle posture angle θv (S107). Then, the control unit 104 adjusts the optical axis angle θo using the acquired vehicle posture angle θv, stores the acquired vehicle posture angle θv as a new reference value (S108), and ends this routine.

As described above, the leveling ECU 100 according to this embodiment includes the memory 108 that stores the initial set value of the vehicle posture angle θv which is acquired in the initialization process and the control unit 104 that adjusts the optical axis angle θo of the lamp unit 10. The control unit 104 stores the reference value of the vehicle posture angle θv, outputs an adjustment signal for the optical axis angle θo in response to change of the total angle θ during a stop of the vehicle, and stores a vehicle posture angle θv, which is the same as the sum of the change of the total angle θ and the reference value of the vehicle posture angle θv, as a new reference value of the vehicle posture angle θv. The control unit 104 maintains the optical axis angle θo in response to the change of the total angle θ during traveling of the vehicle.

The control unit 104 includes the reference value reset unit 104c that performs a predetermined reset process. When a reset signal indicating that the vehicle 300 is in the reference posture is received, the reference value reset unit 104c performs a reset process and causes the reference value of the vehicle posture angle θv to approach the initial set value in the reset process. Accordingly, it is possible to enhance accuracy of automatic leveling control. The reset process uses the reset signal indicating that the vehicle 300 is in the reference posture as a start trigger. That is, in the reset process, the vehicle 300 does not need to be located on the reference road surface. In the reset process, the reference value of the vehicle posture angle θv is merely caused to approach the initial set value which is already stored. Accordingly, in comparison with a case which requires the initialization process, of which one condition is that the vehicle is located on the reference road surface, to be performed again such that the initial set value is acquired again and the reference value of the vehicle posture angle θv is thus corrected, it is possible to enhance accuracy of automatic leveling control in a simpler way.

The control unit 104 in this embodiment also stores the reference value of the road surface angle θr. The control unit 104 stores a road surface angle θr, which is the same as the sum of the change of the total angle θ during traveling of the vehicle and the reference value of the road surface angle θr, as a new reference value of the road surface angle θr. The control unit 104 derives the vehicle posture angle θv including the change of the total angle θ during a stop of the vehicle from the total angle θ and the reference value of the road surface angle θr. Accordingly, it is possible to execute automatic leveling control with high accuracy with a simple control structure.

The reset signal may be at least one signal of: a signal which is transmitted from a predetermined vehicle diagnosing device, a signal which is transmitted from the light switch 304 and which indicates that a predetermined operation is performed on the light switch 304, a signal which is transmitted from the ignition switch 316, and a signal which indicates that the vehicle 300 is located in at least one of a market and a factory. Accordingly, it is possible to enhance accuracy of automatic leveling control without causing complication of the leveling ECU 100.

In this embodiment, since the inclination angle of the vehicle 300 is detected using the acceleration sensor 110, it is not necessary to use a vehicle height sensor. Accordingly, it is possible to reduce costs and to enhance a degree of freedom in vehicle body design in comparison with a case in which a vehicle height sensor is used.

Second Embodiment

A leveling ECU 100 according to a second embodiment is different from that according to the first embodiment in a method of automatic leveling control. This embodiment will be described below. The headlamp unit 210, the leveling ECU 100, and the vehicle 300 have the same configurations as those in the first embodiment. The same elements as in the first embodiment will be referred to by the same reference signs and description and illustration thereof will be appropriately omitted.

In this embodiment, the control unit 104 executes basic control for automatic leveling which will be described below. In basic control of this embodiment, change of the total angle θ during traveling of the vehicle is estimated to be change of the road surface angle θr, change of the total angle θ during a stop of the vehicle is estimated to be change of the vehicle posture angle θv, and the vehicle posture angle θv is derived from the total angle θ.

First, when the vehicle 300 is in a predetermined reference posture on a predetermined reference road surface, a predetermined initialization process is performed. Then, an initial set value of the vehicle posture angle θv is acquired in the initialization process and is stored in the memory 108 as a storage unit. Specifically, the angle calculating unit 104a of the control unit 104 stores an output value of the acceleration sensor 110 in a reference state as the initial set value of the vehicle posture angle θv (for example, θv=0°) in the RAM and the memory 108. In this embodiment, unlike the first embodiment, acquisition of the initial set value of the road surface angle θr is not essential.

Then, the control unit 104 derives the total angle θ using the output value of the acceleration sensor 110 and outputs an adjustment signal for the optical axis angle θo in response to change of the total angle θ during a stop of the vehicle to drive the leveling actuator 226. The control unit 104 avoids driving of the leveling actuator 226 in response to change of the total angle θ during traveling of the vehicle. The control unit 104 uses the initial set value of the vehicle posture angle θv as a reference value of the vehicle posture angle θv at the time of starting of automatic leveling control. Then, the control unit 104 stores the same vehicle posture angle θv as the sum of the change of the total angle θ during a stop of the vehicle and the reference value of the vehicle posture angle θv as a new reference value of the vehicle posture angle θv.

For example, when the vehicle 300 is actually used, in response to the change of the total angle θ during traveling of the vehicle, the control unit 104 avoids generation or output of the adjustment signal instructing to adjust the optical axis angle θo or outputs a maintenance signal instructing maintenance of the optical axis angle θo. The control unit 104 generates and outputs the adjustment signal for the optical axis angle θo in response to the change of the total angle θ during a stop of the vehicle. Specifically, the angle calculating unit 104a repeatedly calculates a current total angle θ at predetermined times during a stop of the vehicle. The calculated total angle θ is stored in the RAM. Then, the angle calculating unit 104a derives the vehicle posture angle θv including the change of the total angle θ during a stop of the vehicle from a difference Δθ1 between before and after the total angle θ changes and the reference value of the vehicle posture angle θv.

For example, the angle calculating unit 104a calculates the difference Δθ1 from the current total angle θ and the previously calculated total angle θ. The angle calculating unit 104a adds the difference Δθ1 to the reference value of the vehicle posture angle θv and acquires a vehicle posture angle θv (θv=reference value of θv+Δθ1) including the change of the total angle θ. The angle calculating unit 104a updates the reference value of the vehicle posture angle θv stored in the RAM using the acquired vehicle posture angle θv as a new reference value of the vehicle posture angle θv. Accordingly, the change of the vehicle posture angle θv and the estimated change of the total angle θ during a stop of the vehicle are introduced into the reference value of the vehicle posture angle $\theta v$. Then, the adjustment instructing unit 104b generates the adjustment signal for the optical axis angle $\theta o$ using the calculated vehicle posture angle $\theta v$ or the updated reference value of the vehicle posture angle $\theta v$.

In this embodiment, when the ignition switch 316 is switched to the OFF state and to the ON state, the same control as in the first embodiment is also executed. However, in this embodiment, only the reference value of the vehicle posture angle $\theta v$ is stored in the memory 108. The same reset process as in the first embodiment is also performed. However, in this embodiment, calculation of the road surface angle $\theta r$ using the total angle $\theta$ and the reset reference value of the vehicle posture angle $\theta v$ is skipped. The reset signal is the same as in the first embodiment.

Figure 5:
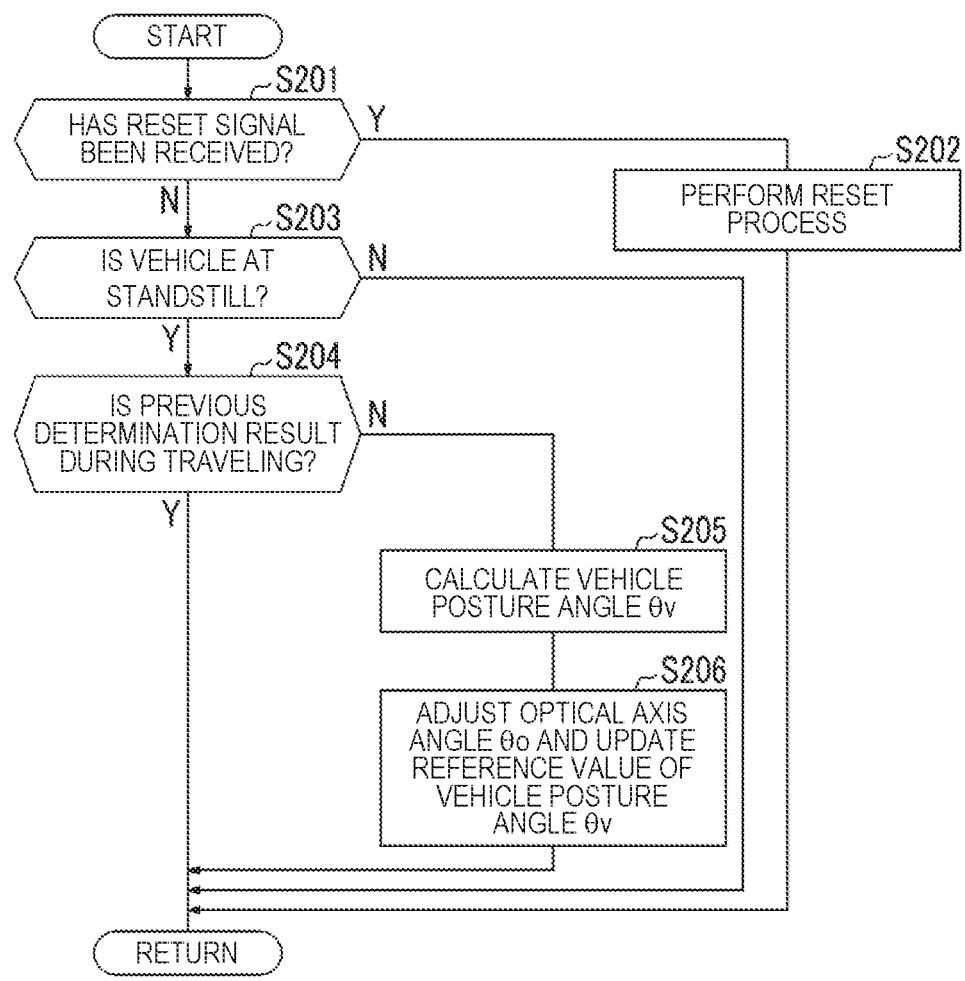
FIG. 5 is a flowchart illustrating an example of automatic leveling control which is performed by a control device for a vehicle lamp according to a second embodiment.

FIG. 5 is a flowchart illustrating an example of automatic leveling control which is performed by the control device for a vehicle lamp according to the second embodiment. For example, this routine is repeatedly performed at the same timings as in the first embodiment. First, the control unit 104 determines whether a reset signal is received (S201). When a reset signal is received (Y in S201), the control unit 104 performs a reset process (S202) and ends this routine. When a reset signal is not received (N in S201), the control unit 104 determines whether the vehicle 300 is at a standstill (S203). When the vehicle 300 is not at a standstill (N in S203), the control unit 104 ends this routine.

When the vehicle 300 is at a standstill (Y in S203), the control unit 104 determines whether it was determined in S203 of a previous routine that the vehicle 300 is traveling (N in S203) (S204). When it was determined in the previous determination that the vehicle 300 is traveling (N in S204), the control unit 104 ends this routine. When it was determined in the previous determination that the vehicle 300 is not traveling (N in S204), the control unit 104 adds a difference $\Delta\theta 1$ between before and after the total angle $\theta$ changes to the reference value of the vehicle posture angle $\theta v$ to calculate a vehicle posture angle $\theta v$ (S205). Then, the control unit 104 adjusts the optical axis angle $\theta o$ using the acquired vehicle posture angle $\theta v$, stores the acquired vehicle posture angle $\theta v$ as a new reference value (S206) and ends this routine.

As described above, the leveling ECU 100 according to this embodiment can execute automatic leveling control with higher accuracy. In this embodiment, the difference $\Delta\theta 1$ between before and after the total angle $\theta$ during a stop of the vehicle changes is added to the reference value of the vehicle posture angle $\theta v$ to newly calculate a vehicle posture angle $\theta v$. Accordingly, since automatic leveling control can be executed without using the initial set value and the reference value of the road surface angle $\theta r$, it is possible to achieve simplification of automatic leveling control.

Third Embodiment

A leveling ECU 100 according to a third embodiment is different from that according to the first embodiment in a method of automatic leveling control. This embodiment will be described below. The headlamp unit 210, the leveling ECU 100, and the vehicle 300 have the same configurations as those in the first embodiment. The same elements as in the first embodiment will be referred to by the same reference signs and description and illustration thereof will be appropriately omitted.

In this embodiment, the control unit 104 executes basic control for automatic leveling which will be described below. In basic control of this embodiment, change of the total angle $\theta$ during traveling of the vehicle is estimated to be change of the road surface angle $\theta r$, change of the total angle $\theta$ during a stop of the vehicle is estimated to be change of the vehicle posture angle $\theta v$, and the vehicle posture angle $\theta v$ is derived from the total angle $\theta$.

First, when the vehicle 300 is in a predetermined reference posture on a predetermined reference road surface, a predetermined initialization process is performed. Then, an initial set value of the road surface angle $\theta r$ is acquired in the initialization process and is stored in the memory 108 as a storage unit. Specifically, the angle calculating unit 104a of the control unit 104 stores an output value of the acceleration sensor 110 in a reference state as the initial set value of the road surface angle $\theta r$ (for example, $\theta r=0°$) in the RAM and the memory 108. In this embodiment, unlike the first embodiment, acquisition of the initial set value of the vehicle posture angle $\theta v$ is not essential.

Then, the control unit 104 derives the total angle $\theta$ using the output value of the acceleration sensor 110 and outputs an adjustment signal for the optical axis angle $\theta o$ in response to change of the total angle $\theta$ during a stop of the vehicle to drive the leveling actuator 226. The control unit 104 avoids driving of the leveling actuator 226 in response to change of the total angle $\theta$ during traveling of the vehicle. The control unit 104 uses the initial set value of the road surface angle $\theta r$ as a reference value of the road surface angle $\theta r$ at the time of starting of automatic leveling control. Then, the control unit 104 stores a road surface angle $\theta r$, which is the same as the sum of the change of the total angle $\theta$ during traveling of the vehicle and the reference value of the road surface angle $\theta r$, as a new reference value of the road surface angle $\theta r$.

For example, when the vehicle 300 is actually used, in response to the change of the total angle $\theta$ during traveling of the vehicle, the control unit 104 avoids generation or output of the adjustment signal instructing to adjust the optical axis angle $\theta o$ or outputs a maintenance signal instructing maintenance of the optical axis angle $\theta o$. The angle calculating unit 104a calculates a current total angle $\theta$ (at a time at which the vehicle stops) from the output value of the acceleration sensor 110 at the time at which the vehicle stops. Subsequently, the angle calculating unit 104a calculates a difference $\Delta\theta 2$ between the total angles $\theta$ before and after traveling. Then, the difference $\Delta\theta 2$ is added to the reference value of the road surface angle $\theta r$ to acquire a road surface angle $\theta r$ including the change of the total angle $\theta$ during traveling of the vehicle ($\theta r$=reference value of $\theta r+\Delta\theta 2$). The angle calculating unit 104a stores the acquired road surface angle $\theta r$ as a new reference value of the road surface angle $\theta r$ in the RAM. Accordingly, the change of the road surface angle $\theta r$ and the estimated change of the total angle $\theta$ during traveling of the vehicle are introduced into the reference value of the road surface angle $\theta r$.

The angle calculating unit 104a can calculate the difference $\Delta\theta 2$ as follows. That is, the angle calculating unit 104a stores the total angle $\theta$ immediately before being started as a reference value of the total angle $\theta$ immediately after the vehicle 300 is started. Then, the angle calculating unit 104a subtracts the reference value of the total angle $\theta$ from the current total angle $\theta$ (at the time at which the vehicle stops) to calculate the difference $\Delta\theta 2$ at the time at which the vehicle stops.

The control unit 104 generates and outputs an adjustment signal for the optical axis angle $\theta o$ in response to change of the total angle $\theta$ during a stop of the vehicle. Specifically, during a stop of the vehicle, the angle calculating unit 104a repeatedly calculates the current total angle $\theta$ at predetermined times. Then, the angle calculating unit 104a derives the vehicle posture angle θv including the change of the total angle θ during a stop of the vehicle from the total angle θ and the reference value of the road surface angle θr. For example, the angle calculating unit 104a subtracts the reference value of the road surface angle θr from the current total angle θ to acquire the vehicle posture angle θv including the change of the total angle θ (θv=θ−reference value of θr). The adjustment instructing unit 104b generates the adjustment signal for the optical axis angle θo using the calculated vehicle posture angle θv.

In this embodiment, when the ignition switch 316 is switched to the OFF state and switched to the ON state, the same control as in the first embodiment is also executed. However, in this embodiment, only the reference value of the road surface angle θr is stored in the memory 108. As first control after being started, the current vehicle posture angle θv is derived from the total angle θ acquired from the current output value of the acceleration sensor 110 and the reference value of the road surface angle θr stored in the memory 108. Then, the optical axis is adjusted using the acquired vehicle posture angle θv.

In this embodiment, the reference value reset unit 104c of the control unit 104 receives a reset signal indicating that the vehicle 300 is in the reference posture and performs a predetermined reset process. In the reset process, the reference value reset unit 104c calculates the current total angle θ from the output value of the acceleration sensor 110. Then, the reference value reset unit 104c causes the reference value of the road surface angle θr stored in the RAM to approach the calculated total angle θ. The term, "approach," includes that the reference value becomes equal to the total angle θ. It is preferable that the reference value reset unit 104c cause the reference value to become equal to the total angle θ. The reference value reset unit 104c may correct the stored reference value or may delete the stored reference value and store the calculated total angle θ as the reference value again. The reset signal is the same as in the first embodiment.

When the reference value of the road surface angle θr approaches the total angle θ through the reset process, the calculated vehicle posture angle θv approaches zero in subsequent basic control. Accordingly, the calculated vehicle posture angle θv approaches the actual vehicle posture angle θv, that is, the vehicle posture angle θv when the vehicle 300 is in the reference posture. Accordingly, it is possible to enhance accuracy of automatic leveling control.

Figure 6:
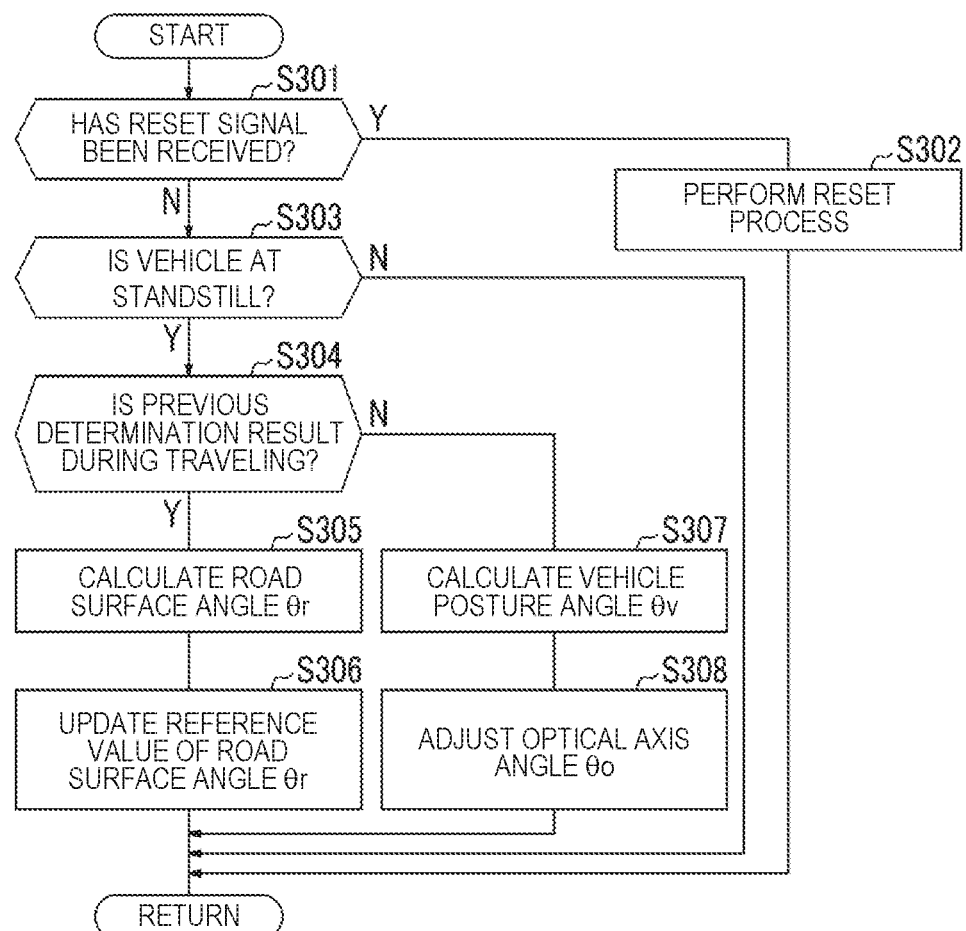
FIG. 6 is a flowchart illustrating an example of automatic leveling control which is performed by a control device for a vehicle lamp according to a third embodiment.

FIG. 6 is a flowchart illustrating an example of automatic leveling control which is performed by the control device for a vehicle lamp according to the third embodiment. For example, this routine is repeatedly performed at the same times as in the first embodiment. First, the control unit 104 determines whether a reset signal is received (S301). When a reset signal is received (Y in S301), the control unit 104 performs a reset process (S302) and ends this routine. When a reset signal is not received (N in S301), the control unit 104 determines whether the vehicle 300 is at a standstill (S303). When the vehicle 300 is not at a standstill (N in S303), the control unit 104 ends this routine.

When the vehicle 300 is at a standstill (Y in S303), the control unit 104 determines whether it was determined in S303 of a previous routine that the vehicle 300 is traveling (N in S303) (S304). When it was determined in the previous determination that the vehicle 300 is traveling (N in S304), the control unit 104 adds a difference Δθ2 between the total angles θ before and after traveling to the reference value of the road surface angle θr to calculate a road surface angle θr (S305). The control unit 104 stores the acquired road surface angle θr as a new reference value of the road surface angle θr (S306) and ends this routine. When it was determined in the previous determination that the vehicle 300 is not traveling (N in S304), the control unit 104 subtracts the reference value of the road surface angle θr from the current total angle θ to calculate a vehicle posture angle θv (S307). Then, the control unit 104 adjusts the optical axis angle θo using the acquired vehicle posture angle θv (S308) and ends this routine.

As described above, the leveling ECU 100 according to this embodiment can execute automatic leveling control with higher accuracy. In this embodiment, the vehicle posture angle θv is derived using the total angle θ and the reference value of the road surface angle θr, and the difference Δθ2 between the total angles θ before and after traveling is added to the reference value of the road surface angle θr to newly calculate a road surface angle θr. Accordingly, since automatic leveling control can be executed without using the initial set value and the reference value of the vehicle posture angle θv, it is possible to achieve simplification of automatic leveling control. In this embodiment, the reference value of the road surface angle θr approaches the total angle θ through the reset process. That is, the initial set value of the road surface angle θr is not used for the reset process. Accordingly, storing the initial set value of the road surface angle θr in the memory 108 can be skipped.

The disclosure is not limited to the above-mentioned embodiments, the embodiments may be combined or variously modified in designs, and embodiments acquired from such combination or modification are included in the scope of the disclosure. New embodiments which are acquired by combination between the above-mentioned embodiments and by combination the embodiments and modifications also have advantages of the combined embodiments and modifications.

In the above-mentioned embodiments, the acceleration sensor 110 is used as an example of an inclination sensor, but another sensor such as a gyro sensor or a geomagnetic sensor may be used as the inclination sensor. In the above-mentioned embodiments, the memory 108 as a storage unit is included in the leveling ECU 100, but a storage medium outside the leveling ECU 100 may serve as the storage unit.

As long as being technically matched, storage of a value which is acquired by calculation using predetermined components includes storing the components which are used to calculate the value. For example, when a reference value of a road surface angle θr is calculated by subtracting a reference value of a vehicle posture angle θv from a total angle θ, the storage of the reference value of the road surface angle θr includes storing the total angle θ and the reference value of the vehicle posture angle θv which are used for the calculation. When the reference value of the vehicle posture angle θv is calculated by subtracting the reference value of the road surface angle θr from the total angle θ, storage of the reference value of the vehicle posture angle θv includes storing the total angle θ and the reference value of the road surface angle θr which are used for the calculation. Storage of the total angle θ includes storing the output value of the acceleration sensor 110.

Arbitrary combination of the above-mentioned elements and conversion of expression of the disclosure to a method, a device, a system, and the like are also possible as aspects of the disclosure. For example, the disclosure associated with the above-mentioned embodiments includes a vehicle lamp system including a vehicle lamp of which an optical axis can be adjusted, an inclination sensor, and a control device for the vehicle lamp.

What is claimed is:

1. A control device for a vehicle lamp, comprising an electronic control unit configured to:
   i) receive a predetermined sensor signal and derive a total angle which is an inclination angle of a vehicle with respect to a horizontal plane based on the sensor signal, the total angle including a road surface angle which is an inclination angle of a road surface with respect to the horizontal plane and a vehicle posture angle which is an inclination angle of the vehicle with respect to the road surface;
   ii) retain an initial set value of the vehicle posture angle, the initial set value being acquired in an initialization process which is performed when the vehicle is in a predetermined reference posture on a predetermined reference road surface;
   iii) retain a reference value of the vehicle posture angle, adjust an optical axis angle of the vehicle lamp in response to a change amount of a total angle during a stop of the vehicle, and retain a sum of the change amount of the total angle during the stop of the vehicle and the reference value of the vehicle posture angle as a new reference value;
   iv) not adjust the optical axis angle in response to a change amount of a total angle during traveling of the vehicle; and
   v) perform a predetermined reset process when a reset signal indicating that the vehicle is in the reference posture is received and cause the reference value of the vehicle posture angle to approach the initial set value in the reset process.

2. The control device according to claim 1, wherein the electronic control unit is configured to:
   i) retain a reference value of the road surface angle and retain a sum of the change amount of the total angle during traveling of the vehicle and the reference value of the road surface angle as a new reference value of the road surface angle; and
   ii) derive the vehicle posture angle including the change amount of the total angle during the stop of the vehicle from the total angle during the stop of the vehicle and the reference value of the road surface angle.

3. The control device according to claim 1, wherein the electronic control unit is configured to derive the vehicle posture angle including the change amount of the total angle during the stop of the vehicle from a difference between before and after the total angle during the stop of the vehicle has changed and the reference value of the vehicle posture angle.

4. The control device according to claim 1, wherein the reset signal is at least one of the following signals:
   i) a signal which is transmitted from a predetermined vehicle diagnosing device;
   ii) a signal which is transmitted from a switch that controls a lighting state of the vehicle lamp and which indicates that a predetermined operation of the switch has been performed;
   iii) a signal which is transmitted from an ignition switch; and
   iv) a signal which indicates that the vehicle is located in at least one of a market and a factory.

* * * * *